United States Patent
Kobayashi et al.

[11] Patent Number: 5,233,177
[45] Date of Patent: Aug. 3, 1993

[54] OPTICAL SENSOR WITH FIBERLESS OPTICAL MEMBER

[75] Inventors: Takao Kobayashi; Yuichi Obara; Kenzo Kobayashi, all of Tokyo; Jitsuo Migita, Sakai, all of Japan

[73] Assignee: The Furukawa Electric Co., Ltd., Tokyo, Japan

[21] Appl. No.: 801,951

[22] Filed: Dec. 3, 1991

[30] Foreign Application Priority Data

Jan. 18, 1991 [JP] Japan .................................. 3-19472
Sep. 25, 1991 [JP] Japan ................................ 3-273194

[51] Int. Cl.$^5$ ............................................ H01J 40/14
[52] U.S. Cl. ........................... 250/208.1; 250/227.11
[58] Field of Search ...................... 250/227.32, 227.31, 250/216, 208.1, 201.5, 227.20, 227.11, 226, 222.1, 223; 356/409

[56] References Cited

U.S. PATENT DOCUMENTS

| | | | |
|---|---|---|---|
| 3,500,054 | 3/1970 | Lasalle et al. | 250/227.2 |
| 3,994,590 | 11/1976 | Di Martini et al. | 356/409 |
| 4,149,197 | 4/1979 | Kos et al. | 250/208.1 |
| 4,232,219 | 11/1980 | Yamamoto et al. | 250/226 |
| 4,539,482 | 9/1985 | Nose | 250/208.1 |
| 4,543,490 | 9/1985 | Gupta | 250/208.1 |
| 4,544,842 | 10/1985 | Engemann et al. | 250/227.2 |
| 4,878,582 | 11/1989 | Codding | 250/226 |
| 4,931,636 | 6/1990 | Huggins | 250/226 |
| 5,000,569 | 3/1991 | Nylund | 250/226 |
| 5,004,905 | 4/1991 | Yoshinouchi et al. | 250/208.1 |

Primary Examiner—David C. Nelms
Attorney, Agent, or Firm—Frishauf, Holtz, Goodman & Woodward

[57] ABSTRACT

An optical sensor has an optical block including a substrate, a light-emitting element formed on the substrate, and a light-receiving element formed on the substrate by using an adjusting member for arranging side-by-side with the light-emitting element, a light-transmitting member located between the optical block and an object, and connecting terminal optically connected to the light-emitting element and the light-receiving element. It is preferable that the light-transmitting member is separated into a plurality of light transmitting members in correspondence with areas separated on the object. There is also provided an optical sensor having a light-transmitting member, a plurality of incident optical fibers, optically coupled with the light-transmitting member, for transmitting light emitted from a light-emitting element to the light-transmitting member, a plurality of outgoing optical fibers, optically coupled with the light-transmitting member, for transmitting light passed through the light-transmitting member after being reflected on an object to the light-receiving element, and a housing for integrally housing the light-transmitting member, the incident optical fiber, and the outgoing optical fibers.

11 Claims, 10 Drawing Sheets

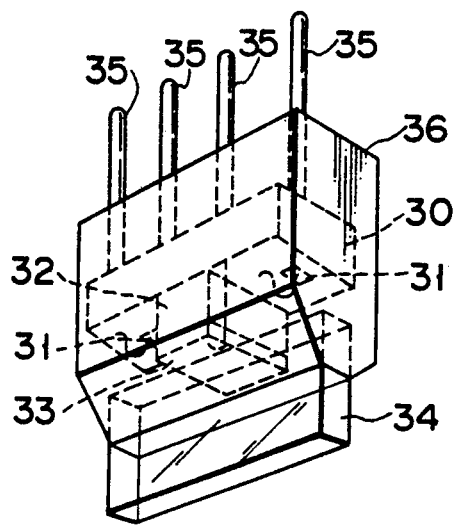
F I G. 3
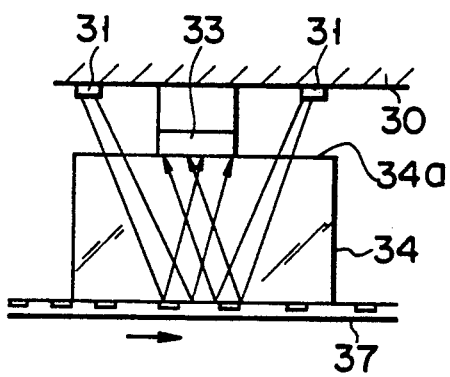
F I G. 4A
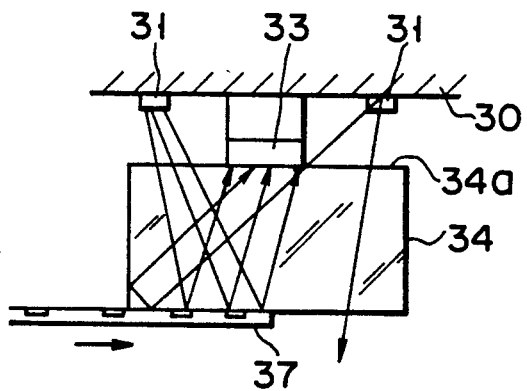
F I G. 4B

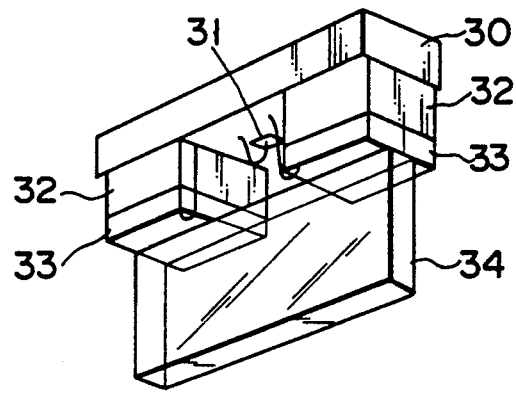
F I G. 5
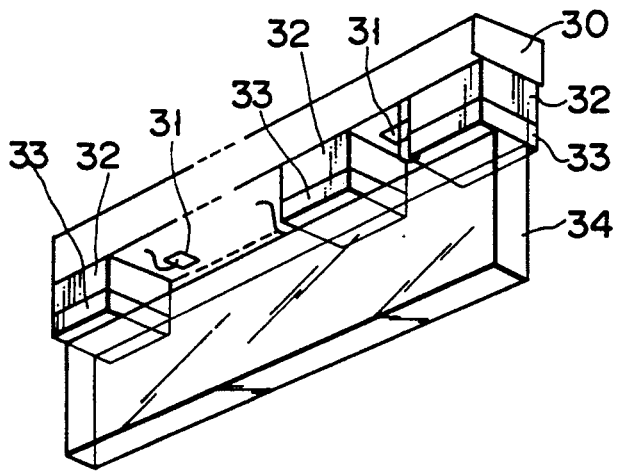
F I G. 6

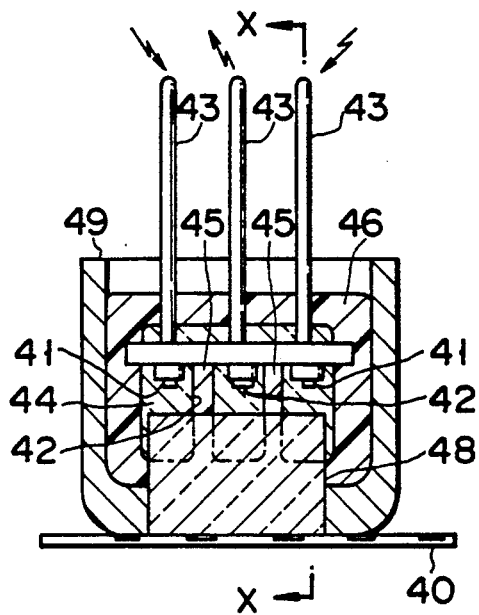
F I G. 7A
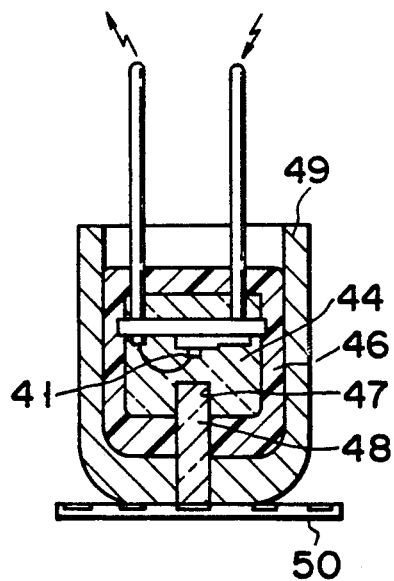
F I G. 7B

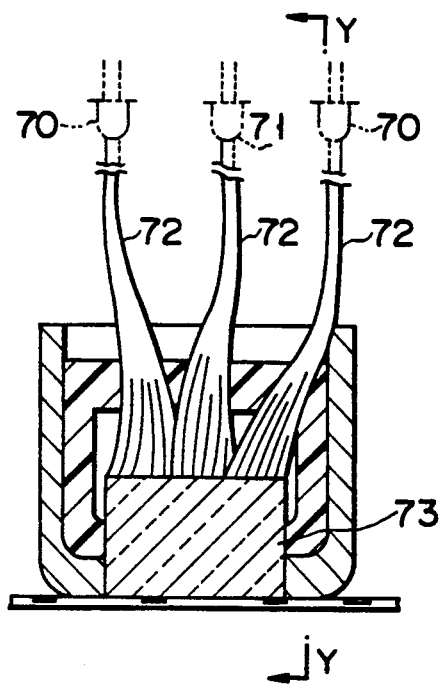
F I G. 11A
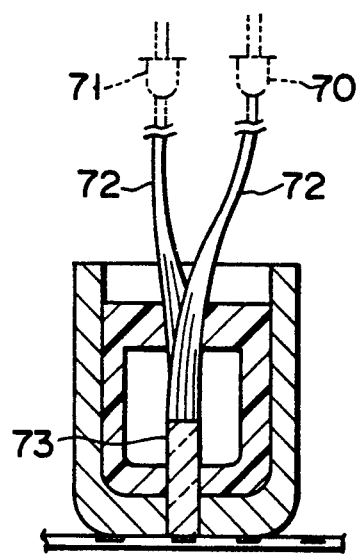
F I G. 11B

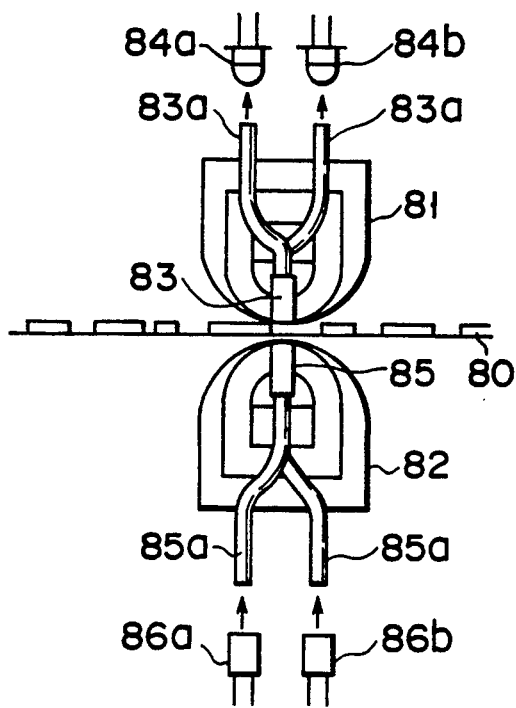
F I G. 12
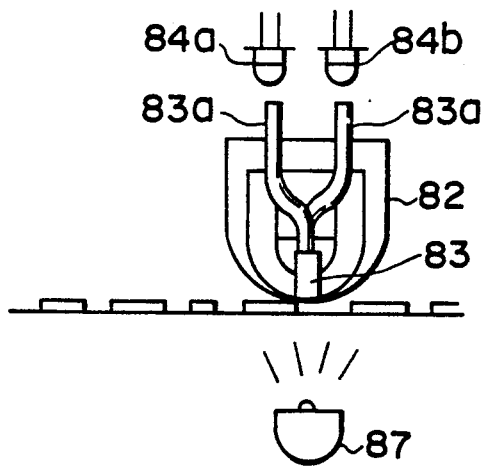
F I G. 13

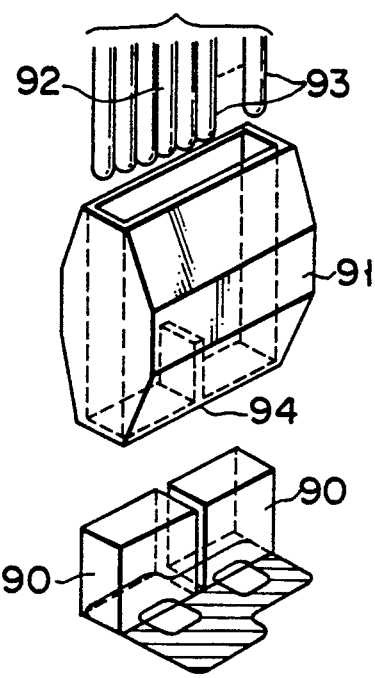
F I G. 14
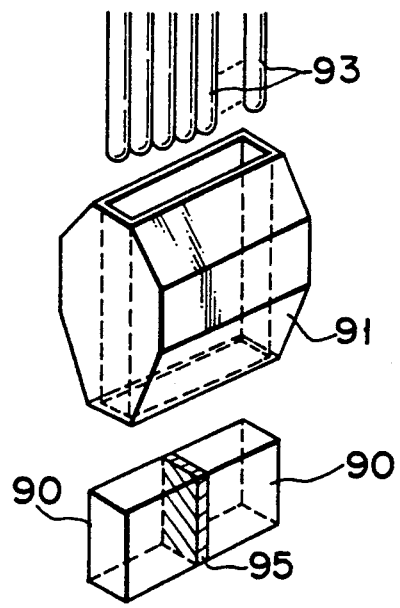
F I G. 15

OPTICAL SENSOR WITH FIBERLESS OPTICAL MEMBER

BACKGROUND OF THE INVENTION

Field of the Invention

The present invention relates to an optical sensor, and more particularly to one employed in an optical head for optically detecting figures, patterns, etc., printed on an object such as a printed matter, or one employed in an opto-magnetic composite head for optically and magnetically detecting such an object.

Description of the Related Art

Conventionally, in order to examine the authenticity of a magnetic-data-recorded printed material data such as money order, bank check, etc., a magnetic pattern 10 (special character: figure drawn in a 7×9 matrix of 0.3 mm square blocks) written with magnetic ink on the object, such as shown in FIG. 1, is identified by the following methods.

According to a magnetic identification method, an object having a magnetic pattern is run in front of a magnetic head made by winding a coil around a magnetic core. Thus, the amount of magnetism of the pattern is picked up by a certain track of the magnetic head. Based on the quantity of magnetism obtained, the magnetic pattern on the object is recognized, and the recognized pattern is compared with a reference pattern already recorded, to verify the object for its authenticity.

According to an optical and magnetic identification method, as shown in FIG. 2, employed is an opto-magnetic composite head 2, which is a combination of a magnetic head made by winding a coil 21 on a magnetic core 20, and an optical head consisting of a light-transmitting member 23 provided between tip end portions 22 opposing the core 20, a plurality of optical fibers 24 connected to the light transmitting member 23, and a housing 25 for housing the above. While a magnetic pattern printed on an object with magnetic ink is detected by the magnetic head, the density of the object is detected by the optical head. The detected data are compared with reference patterns already recorded, to determine the authenticity of the object.

However, these two popular conventional identifying methods have the following problems.

With the first method, despite that the magnetic pattern of the object is authentic, if the magnetic ink is unevenly applied and the magnetic pattern is non-uniformly formed, an output value picked up by the magnetic head during a detection is varied, resulting in possible misjudgment, i.e., recognizing the authentic object as a false one. Thus, the reliability of such judgment is not very high.

Moreover, with this method, the resolution of the magnetic head increases, but the output of the magnetic head decreases, as the distance between the opposing tip end portions of the core is made shorter. In reverse, if the distance between the tip end portions is made longer, the output increases, but the resolution decreases. Consequently, the quantity of magnetism of the pattern on the object, the fineness of the magnetic pattern, the resolution required for determining the authenticity of the object, and the like, must be all taken into consideration to set the most appropriate distance between the tip end portions to obtain the best result. It should be particularly pointed out that setting of the distance cannot be very easily completed.

With the second method, both magnetic and optical detections are used; therefore the efficiency of detection can be higher than that of the first method. However, the precision still does not reach a satisfactory level.

SUMMARY OF THE INVENTION

The purpose of the present invention is to provide an optical sensor for accurately detecting the optical pattern of an object so that identification of the pattern can be exactly performed.

The purpose of the invention can be achieved by an optical sensor having an optical block including a substrate, a light-emitting element formed on the substrate, and a light-receiving element formed on the substrate by using an adjusting member for arranging side-by-side with the light-emitting element, a light-transmitting member located between the optical block and an object, and a connecting terminal optically connected to the light-emitting element and the light-receiving element. It is preferable here that the light-transmitting member is separated into a plurality of light-transmitting members in correspondence with areas separated on said object.

Further, the purpose can be also achieved by an optical sensor having a light-transmitting member, a plurality of incident optical fibers, optically coupled with the light-transmitting member, for transmitting light emitted from a light-emitting element to the light-transmitting member, a plurality of outgoing optical fibers, optically coupled with the light-transmitting member, for transmitting light passed the light-transmitting member after reflected on an object to the light-receiving element, and a housing for integrally housing the light-transmitting member, the incident optical fiber, and the outgoing optical fiber.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a perspective view of an embodiment of an optical sensor of the present invention;

FIGS. 4A and 4B are explanatory diagrams respectively showing incident and reflecting light in the optical sensor depicted in FIG. 3;

FIGS. 5, 6, 8, 9 and 10, and 12, 13, 14, 15, and 16 are perspective views of another embodiment of the optical sensor according to the present invention;

FIG. 7A is an explanatory diagram of another embodiment of the optical sensor according to the present invention, and FIG. 7B is a cross section along the line X—X shown in FIG. 7A;

FIG. 11A is an explanatory diagram of another embodiment of the optical sensor according to the present invention, and FIG. 11B is a cross section along the line Y—Y shown in FIG. 11A.

DETAILED DESCRIPTION OF THE PREFERRED EMBODIMENT

Figure 1:
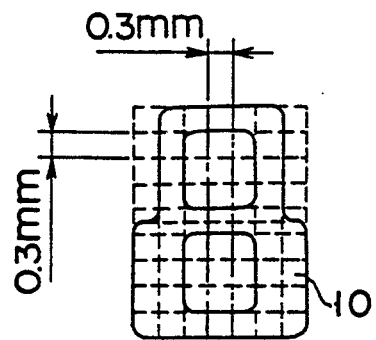
FIG. 1 is a diagram of an example of an object to be examined by an optical sensor.
Figure 2:
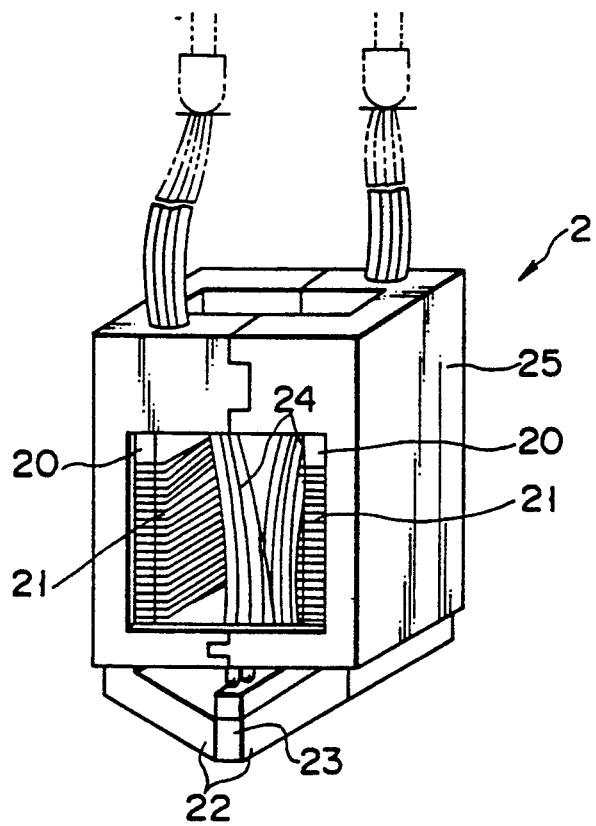
FIG. 2 is a diagram of a conventional opto-magnetic composite head.

The optical sensor of the present invention will now be explained in detail with reference to accompanying drawings.

In FIG. 3, illustrated is a substrate 30. Two light-emitting elements 31 are placed on one of the surfaces of the substrate 30. A light-receiving element 33 is provided between the light-emitting elements 31 by using an adjusting member 32, due to which the light-receiving element 33 projects downward further from the light-emitting element 31 by the thickness of the adjusting member 32. On the bottom surface of the light-receiving element 33, arranged is a light-transmitting member 34 which is arranged such that it touches the bottom surface. A connecting terminal 35 is guided out upward from the other surface of the substrate 30, and is electrically connected to light-emitting element 31, or light-receiving element 33. The substrate 30, light-emitting element 31, light-receiving element 33, light-transmitting member 34, and connecting terminal 35 are all integrated in a housing 36.

Some of the examples of the materials for housing 36 are ceramics, glass-epoxy. An LED, etc., can be used as the light-emitting element 31. A P.D (photo-diode) or a P.T (photo-transistor) can be used as the light-receiving element 33. Some of the examples of the material for the adjusting member 32 are glass-epoxy, etc. It should be noted that a substrate made of a material, which can be processed, would not need such the adjusting member 32, but the substrate itself can be shaped to have a projection equivalent to member 32. Glass, etc., can be used as the light-transmitting member 34.

The thickness of the adjusting member 32, that is to say, the distance between the light-emitting element 31 and the light-transmitting member 34, can be determined in consideration of all of the light-emitting of the light-emitting element 31, the light-receiving sensitivity of the light-receiving element 33, the length of the light path of the light-transmitting member 34, the distance between the center of the light-emitting element 31 and that of the light-receiving element 33, and the like.

Figure 4C:
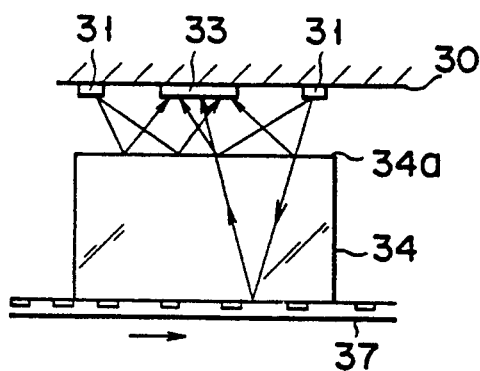
FIG. 4C is an explanatory diagram showing incident and reflecting light in a conventional optical sensor.

FIGS. 4A and 4B illustrate light paths of the optical sensor having the above-mentioned structure. As can be seen in these figures, the light beam emitted from the light-emitting element 31 is transmitted through the light-transmitting member 34, and then reflected on the object 37. The light beam reflected on the object is transmitted through the light-transmitting member 34 and reaches the light-receiving element 33. Since the light-receiving member 33 projects downward from the light-emitting element 31, the light emitted from the light-emitting element 31, or, as shown in FIG. 4C, the light reflected on the upper surface 34a of the light-transmitting member 34, is not made incident directly on the light-receiving element 33. Therefore, crosstalk between the light-emitting element 31 and the light-receiving member 33 can be prevented. Further, the mid-point value of the outputs can be obtained.

In this optical sensor, the light-receiving member or element 33 and the light-transmitting member 34 can be arranged away from each other. Also, for extreme circumstances, transparent resin such as epoxy resin etc., can be filled between the elements 31 and 33, and the light-transmitting member 34 in order to protect the light-emitting element 31 and the light-receiving element 33. In addition, a dispersing agent may be blended into this transparent resin so that light propagates uniformly in the transparent resin.

Alternatively, as shown in FIG. 5, the light-emitting element 31 can be located in the center portion of the substrate 30, and light-receiving elements 33 are arranged at both sides of the substrate by using respective adjusting members 32; thus, the light-receiving elements 33 may be arranged such as to project further downward from the light-emitting element 31. In the case where the number of light-emitting elements 31 is less than that of light-receiving elements 33 as in this situation, the light-emitting elements 31 must have a large output to obtain an excellent S/N ratio. Further, as can be seen in FIG. 6, a plurality of light-emitting elements 31 and light-receiving elements 33 provided by using adjusting members 32 can be alternately arranged.

With such an optical sensor, if the distance between a light-emitting element and a light-transmitting member is shorter than that between a light-receiving element and a light-transmitting member, that is, a reverse situation to the above-mentioned, a similar advantage is obtained. Also, a light-emitting element and a light-receiving element having substantially the same peak wavelengths are associated as a pair, and a plurality of such pairs having peak wave-lengths different from each other may be manufactured, and made into a color sensor.

FIGS. 7A and 7B show other possible structures of sensors which may be employed in the method of preventing generation of crosstalk between a light-emitting element and a light-receiving element without permitting light emitted from the light-emitting element, or reflected on the upper surface of the light-transmitting member, to be incident directly on the light-receiving element. Such optical sensors can be manufactured in the following steps. Two light-emitting elements 41 and a light-receiving element 42 are placed on a substrate 40, and a connecting terminal 43 is connected to each of these elements. Then, the two light-emitting elements 41, the light-receiving element 42, the substrate 40, and the connecting terminals 43 are molded into an integral body with transparent resin 44. It should be noted here that a disconnecting groove 45 is provided between each adjacent pair of these elements. After that, shading resin 46 such as epoxy resin, is covered on the outer surface of the transparent resin 44, and during this step, the disconnecting grooves 45 are also filled therewith. Then, a fitting groove 47 is formed from the lower end of the shading resin 46 over the region of the transparent resin 44 along the longitudinal direction, and a light-transmitting member 48 having substantially the same thickness as the width of the fitting groove 47 is fit thereinto. Lastly, the product is covered by a housing 49. It should be noted here that the bottom outer surface of the housing, that is, the surface brought into contact with an object 50, is polished along with the light-transmitting member 48 to be slidable.

According to an optical sensor having such a structure, the shading resin 46 in each disconnecting groove 45 serves to prevent light from leaking to the outside, and the light emitted from the light-emitting element 41 is made incident on the light-transmitting member 48. Similarly, the light reflected on the object 50 and transmitted through the light-transmitting member 4 is prevented from leaking to the outside by the shading resin 46, and is made incident on the light-receiving element 42. To summarize, the light emitted from the light-emitting element 41 is guided by the light-transmitting member 48, and the light reflected on the object 50 and passed through the light-transmitting member 48 is guided to the light-receiving element 42. Thus, crosstalk between the light-emitting element 41 and the light-receiving element 42 is prevented.

Figure 8:
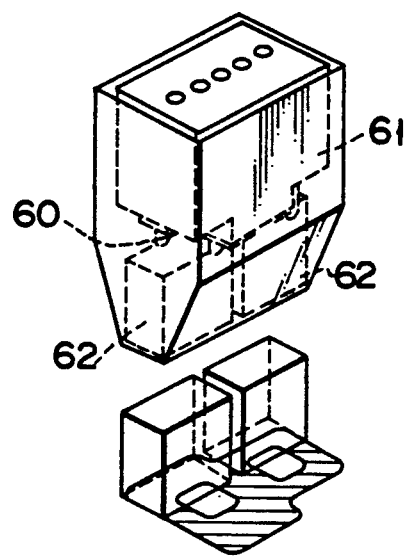

FIG. 8 shows another embodiment of the optical sensor according to the present invention. As shown in this figure, two of each of chip-shaped light-emitting elements and light-receiving elements are placed on a substrate 60 made of a glass chip such that a light-emitting element and light-receiving element make a pair, thus forming a module 61. Two transparent members 62 are arranged below the module 61 such that they are located at the corresponding positions to these two pairs of the elements. With this structure, an optical pattern is separated into two blocks, and each block is separately detected, enhancing the precision of identification of an optical pattern. To further simplify the structure, a module including a light-emitting element and two light-receiving elements can be employed to identify an object independently.

Figure 9:
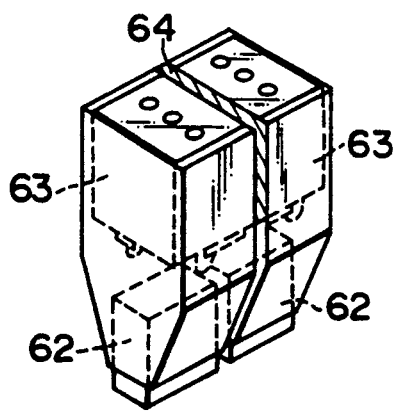

In the alternative, a module which is separated into module units 63 such that each of the module units 63 makes a pair with each of transmitting members 62, such as shown in FIG. 9, can be employed. Here, crosstalk between the module units 63 can be prevented by providing a spacer 64 therebetween.

With this structure, various kinds of identification can be performed by simply changing a type of the chip of a module unit to another. For example, to identify an object having an optical pattern made with ink which reacts only to the light having a particular wavelength, all that is required is to replace the chip with another chip having a light-emitting element which emits the light of the particular wavelength.

Figure 10:
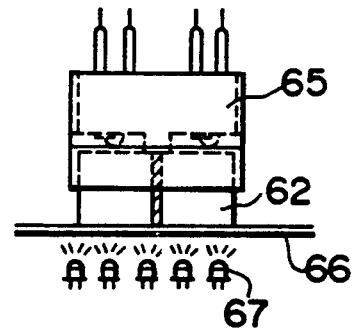

Alternatively, a module 65 including only a light-receiving element, such as shown in FIG. 10, can be employed. To utilize this module 65, light-emitting members 67 such as LEDs, or lamps, are arranged below an object 66. Here, the optical pattern on the object is identified by picking up the light which has been transmitted through the transmitting member 62. According to this method, resolution can be enhanced.

An optical sensor of the present invention, as can be seen in FIGS. 11A and 11B, may have a structure in which optical fiber bundles 72 are optically coupled with each of a light-emitting element 70 and light-receiving element 71, and an array of the optical fibers is optically coupled with the light-transmitting member 73. Here, in order to detect exactly the red-color and the green-color, it is preferable that the light-emitting element 70 uses a light-emitting element (red-color light-emitting element) for emitting light having a highest intensity in red color, and a light-emitting element (green-color light-emitting element) for emitting light having a highest intensity in green color, and the light-receiving element 71 uses a light-receiving element (red-color light-receiving element) having a highest sensitivity in red color and a light-receiving element (green-color light-receiving element) having a highest sensitivity in green color. Further, to simplify the structure, such an arrangement may be limited only to either one of the light-emitting element 70 and light-receiving element 71.

FIG. 12 shows an example of such an optical sensor. This optical sensor comprises of a light-receiving member 81 which slides on one of the surfaces of an object 80, and a light-emitting member 82 which slides on the other surface of object 80. The light-receiving member 81 has a structure in which one end of the same side of two incident fiber arrays 83a are fixed on the inner bottom surface of the light-transmitting body 83, and the other end of one of the incident fiber arrays 83a is optically coupled with a red-color light-receiving element 84a, and the other end of the other input fiber array 83a is optically coupled with a green-color light-receiving element 84b. The light-emitting member 82 has a structure in which one end of the same side of two output fiber arrays 85a are fixed on the inner upper surface of the light-transmitting member 85, and the other end of one of the output fiber arrays 85a is optically coupled to a red-color light-emitting element 86a, and the other end of the other output fiber array 85 is optical coupled to a green-color light-emitting element 86b. A halogen lamp 87 as shown in FIG. 13, may be used as a light-emitting member, or a light-emitting member 82 shown in FIG. 12 may be used.

Further, in this optical sensor, an optical filter may be provided for each of the light-emitting elements and light-receiving elements so as to shift the peak wavelength of each of the red-color, and green-color components into the wavelength band which is the most effective for detecting the optical pattern on an object.

Also, such an optical sensor having optical fibers may have the above-mentioned structure, in which an optical pattern is independently detected. For example, as shown in FIG. 14, two light-transmitting members 90 made of glass chips having a width of about 2 mm are arranged about 0.3 mm away from each other, in a common housing 91. Then, optical fiber bundles 93 each formed by arraying 15 of plastic optical fibers 92 having the outer diameter of 0.25 mm$\phi$, are coupled to the light-transmitting members 90. Of many optical fibers 92, those located at the position corresponding to the partition 94 of the common housing 91 are dummy ones, which are not coupled to any of the light-emitting and light-receiving elements. (Further, each of the optical fibers is optically coupled with either a light-emitting element or a light-receiving element.) Thus, the precision of identifying the optical pattern of an object can be raised.

In this embodiment also, adhesive 95 can be provided between the two light-transmitting members 90 as a spacer, as shown in FIG. 15. Here, the light-transmitting members 90 slide on the object; therefore the material of the adhesive 95 should be selected from those which exhibit the wear resistance, such as epoxy resin.

Figure 16:
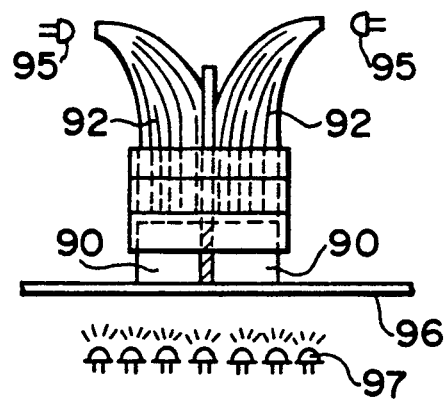

FIG. 16 shows another variation in which the optical fibers 92 are optically coupled only with the light-receiving elements 95, and light-emitting members 97 such as LEDs or lamps are arranged underneath the object 96. With this structure, an optical pattern can be identified by detecting the light to the light-transmitting members 90. According to this method, the resolution can be enhanced.

Figure 17:
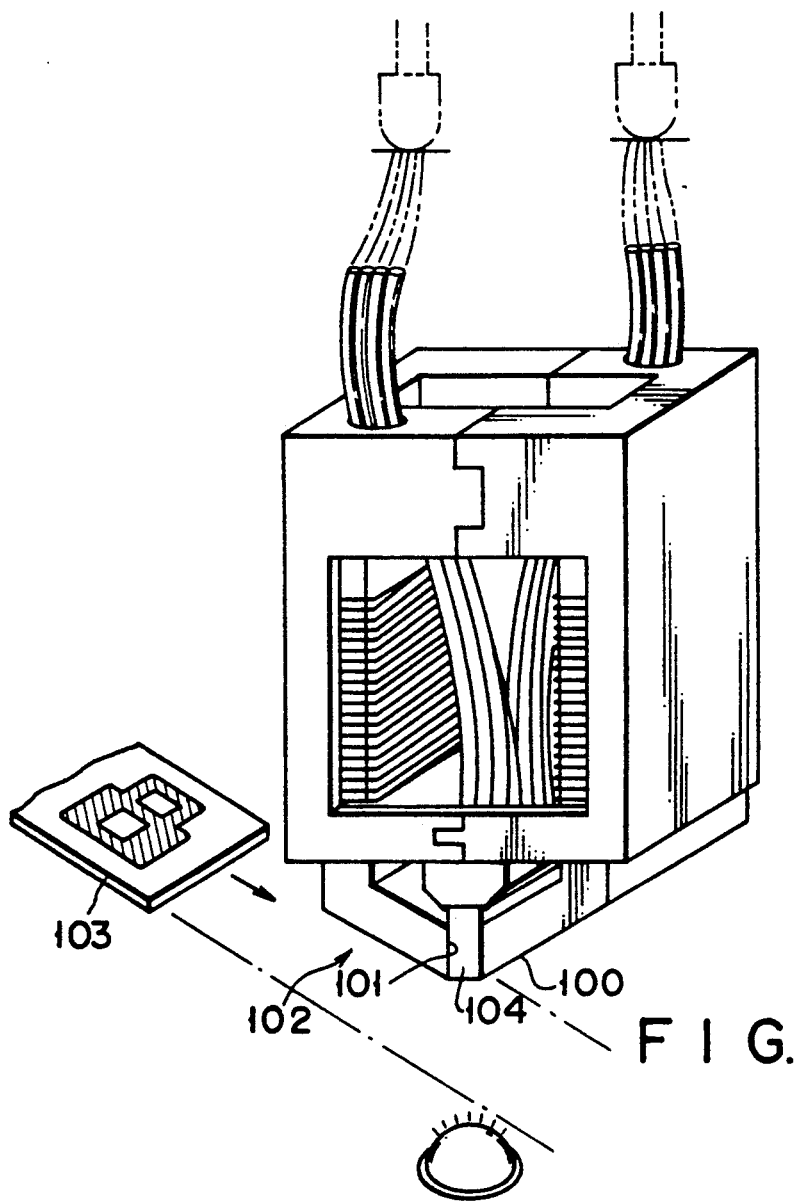
FIG. 17 is a perspective diagram of a magneto-optical head in which an optical sensor of the present invention is employed.

FIG. 17 shows another embodiment of the present invention. As can be seen in this figure, the optical sensor of the invention may be provided between the tip end portions 101 of the core of the magnetic head 100 to make an opto-magnetic composite head 102. To identify the pattern on an object 103 by use of this opto-magnetic composite head 102, the magnetic pattern recorded on the object 103 is detected by the magnetic head 100, and the optical pattern drawn also thereon is detected by the optical sensor 104.

As described, with the optical sensor of the present invention, the optical pattern of an object can be accurately detected, and therefore highly precise identification can be performed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical sensor which does not employ optical fibers, comprising:
    an optical block including a substrate, a light-emitting element formed on said substrate, and light-receiving element arranged on said substrate with an adjusting member interposed between said substrate and said light-receiving element to cause said light-receiving element to project from said substrate by a distance greater than said light-emitting element;
    a light-transmitting member located between said optical block and an object, said light-transmitting member not including optical fibers;
    wherein a distance between said light-receiving element and said light-transmitting member is smaller than a distance between said light emitting element and said light-transmitting means; and
    connecting terminal means for electrically connecting to said light-emitting element and said light-receiving element.

2. An optical sensor according to claim 1, comprising a plurality of said light-transmitting members, the number of said light-transmitting members corresponding to a number of a plurality of separated areas of the object.

3. An optical sensor according to claim 2, comprising a plurality of said optical blocks, the number of said optical blocks corresponding to the number of said light-transmitting members.

4. An optical sensor according to claim 1, comprising two of said light-emitting elements formed on said substrate, and wherein said adjusting member having said light-receiving element thereon is located between said two light-emitting elements.

5. An optical sensor according to claim 1, comprising two of said adjusting members having respective light-receiving elements thereon, and wherein each of said two adjusting members are arranged on respective opposite sides of said light-emitting element.

6. An optical sensor which does not employ optical fibers, comprising:
    an optical block including a substrate, a light-emitting element formed on said substrate, and a light-receiving element arranged on said substrate with an adjusting member interposed between said substrate and said light-receiving element to cause said light-receiving element to project from said substrate by a distance greater than said light-emitting elements;
    a light-transmitting member formed between said light-receiving element and said light-emitting element, said light-transmitting member not including optical fibers; and
    light guiding means located between said light-receiving element and said light-emitting element for guiding a light emitted from said light-emitting element to said light-transmitting member and for guiding a light reflected by an object to said light-receiving element.

7. An optical sensor according to claim 6, comprising a plurality of said light-transmitting members, the number of said light-transmitting members corresponding to a number of separated areas of the object.

8. An optical sensor according to claim 7, comprising a plurality of said optical blocks, the number of said optical blocks corresponding to the number of said light-transmitting members.

9. An optical sensor according to claim 6, wherein said light guiding means comprises a first transparent resin portion in which said light-emitting element and said light-receiving element are buried, a second transparent resin portion in which said light-emitting element is buried, and a shading resin portion in which said light-receiving element is buried.

10. An optical sensor according to claim 9, wherein said shading resin portion is non-transparent.

11. A composite magnetic and optical comprising:
    a magnetic sensor including a magnetic core means having an elongated distal gap and adapted to detect a magnetic pattern recorded on a record medium;
    an optical sensor located along said distal gap of said magnetic sensor, said optical sensor not including optical fibers, and said optical sensor comprising;
        an optical block including a substrate, a light-emitting element formed on said substrate, and a light-receiving element arranged on said substrate with an adjusting member interposed between said substrate and said light-receiving element to cause said light-receiving element to project from said substrate by a distance greater than said light-emitting element;
    a light-transmitting member located between said optical sensor and an optical, said light-transmitting member not including optical fibers;
    wherein a distance between said light-receiving element and said light-transmitting member is smaller than a distance between said light-emitting element and said light-transmitting member; and
    connecting terminal means for electrically connecting to said light-emitting element and said light-receiving element.

* * * * *